July 4, 1967  T. P. HUBBARD  3,329,049
POLYMER CHIP CUTTER
Filed March 29, 1965
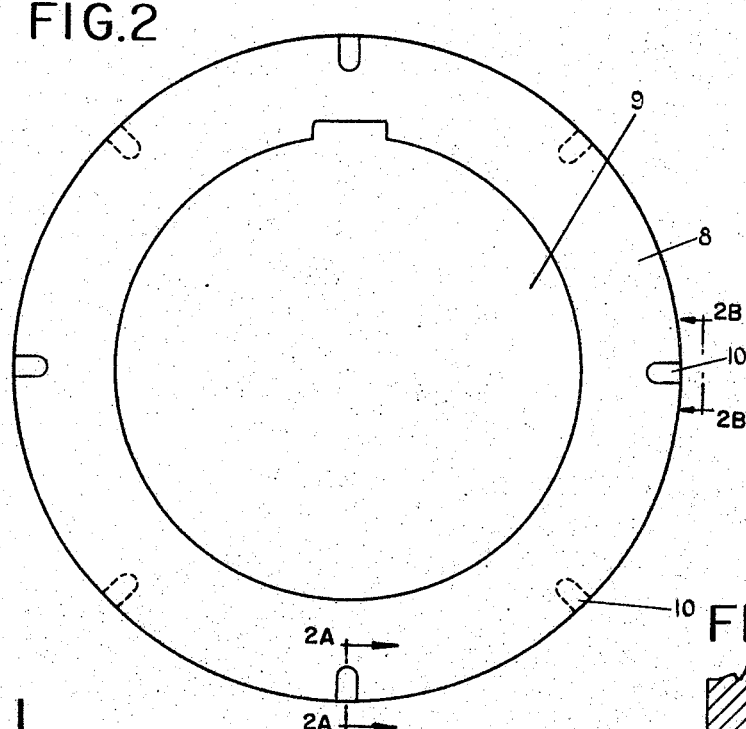
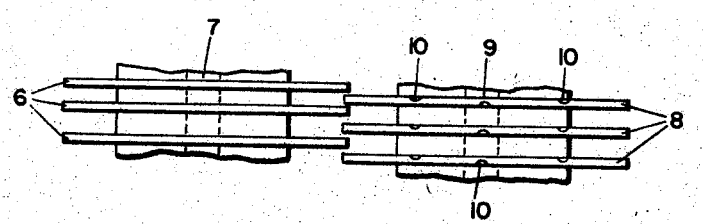
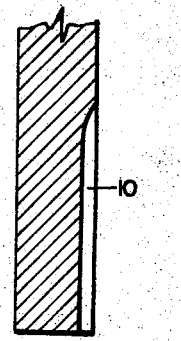
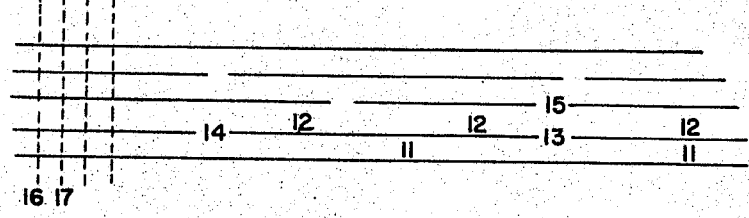
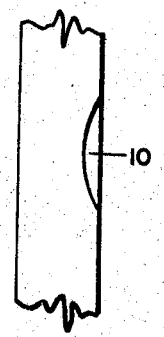
INVENTOR
TERENCE PHILLIP HUBBARD
By Cushman, Darby & Cushman
ATTORNEYS

United States Patent Office 3,329,049
Patented July 4, 1967

3,329,049
POLYMER CHIP CUTTER
Terence Phillip Hubbard, Marsden, England, assignor to Imperial Chemical Industries Limited, London, England, a corporation of Great Britain
Filed Mar. 29, 1965, Ser. No. 443,306
Claims priority, application Great Britain, Apr. 2, 1964, 13,738/64
3 Claims. (Cl. 83—47)

The present invention relates to the comminution of a material in the form of an elongated sheet.

According to the present invention we provide an improvement in the process for the comminution of an elongated sheet material such, for example as tough, synthetic polymer by first cutting the said sheet longitudinally into narrow strips and then cross-cutting the said strips to form particles, characterised by carrying out the longitudinal cutting in such a manner that the derived strips remain attached to each other over a proportion of their length until the cross-cutting takes place.

An advantage of the process of our invention is that by the use of it, strips of material formed by the longitudinal cutting are retained in fixed spatial relationship to each other until the cross-cutting takes place, thus avoiding overlapping of the strips, with corresponding increase in the ease of cross-cutting.

We have found that for particular applications, such, for example, as applications wherein a smooth flow of the particles is required from a container, the presence of more than a minor proportion of oversize particles is unacceptable. The presence of an acceptably small proportion of oversize particles can be ensured by arranging that the uncut portion separating collinear longitudinal cuts is no greater than the distance between the successive cross-cuts and that the uncut portions remaining in adjacent strips after the longitudinal cutting are staggered with relation to each other. In general we find it advantageous to arrange that the ratio between the length of each continuous longitudinal cut and each uncut portion separating collinear longitudinal cuts is relatively high. This ratio can, however, be 1:1 provided that longitudinal cuts are of length equal to the length of the required particles, that the distance between cuts in a collinear series of cuts is equal in length to the length of the required particle, that cuts in adjacent longitudinal series of cuts are staggered by an amount equal to the length of one cut and that the cross-cuts are made in line with the ends of the longitudinal cuts.

Materials which may be comminuted by the process of our invention include polymers, examples of which are polyesters, a particular example of which is poly(ethylene terephthalate), polyamides, polyolefins and polyvinyl chloride.

A particular embodiment of our invention will now be described by way of example with particular reference to the accompanying drawings in which:

FIGURE 1 shows intermeshing discs of a cutter,
FIGURE 2 shows a detail of one of the notched discs of FIGURE 1,
FIGURES 2A and 2B are sectional views on lines 2A—2A and 2B—2B of FIGURE 2, respectively; and
FIGURE 3 shows a portion of a sheet of polymer as cut by such a cutter as shown in FIGURE 1.

In FIGURES 1 and 2, similar items are similarly designated. Referring to FIGURES 1 and 2, a set of discs 6, of 9 inches diameter and 5/32 inch thickness, and which are carried on a common axle 7, are arranged to intermesh to the extent of 0.040 inch with a second set of discs 8 carried on a common axle 9. The periphery of each face of each of the discs 8 is in very close proximity to the periphery of a face of one of the discs 6. The number of the discs 8 is such that on passage through the cutter the whole of the width of the sheet of material is cut into strips. Each of the discs 8 bears four evenly spaced notches 10 in the periphery of each face, the notches being stepped with respect to the notches 10 on the other side so that each notch is equally distant from the nearest two notches on the other side. The number of discs 8 is 64, the number of discs 6 is 65. Thus each side of each disc 8 meshes with a side of a disc 6.

The length of each notch 10 measured radially from the periphery is 5/16 inch. The maximum depth of each notch 10 is 0.025 inch measured from the face of the disc 8 into the material of the disc 8. Each notch 10 is formed by means of a cutter 1/4 inch radius and its depth thus varies from 0.025 inch at the centre line of the notch 10 to nothing at either edge.

In operation, the discs 6 and the discs 8 are driven in opposite sense by the axles 7 and 9 respectively. The sheet of material is fed into the intersection of the sets of discs and at right angles to the plane of each disc. The sheet of material is cut into the form as shown in FIGURE 3 consisting of strips 11, 12 and so on, held together by sections 13, 14, 15 and so on. Cross-cutting at 16–16′, 17–17′ and so on, results in the formation of the required particles. With a suitable choice of thickness of the sheet of material, width of the strips and frequency of cross-cut, the particles may be cubic.

Using the cutter as hereinbefore described, very satisfactory results were obtained in the comminution of poly- (ethylene terephthalate).

An exactly similar cutter, differing only in that the notches 10 were twelve in number in the periphery of each face of each of the discs 8, was used for the comminution of poly(ethylene terephthalate) with very satisfactory results.

What we claim is:

1. An improvement in the process for the comminution of an elongated sheet of material by first cutting the said sheet longitudinally into narrow strips and then cross-cutting the said strips to form particles, characterised by carrying out the longitudinal cutting in such a manner that the derived strips remain attached to each other over a proportion of their length until the cross-cutting takes place and by carrying out the cross-cutting at a frequency such that the length of the attached portions is no greater than the distance between successive cross-cuts.

2. A process for cutting an elongated sheet of material into a plurality of small particles comprising continuously slitting said sheet from end to end with a plurality of parallel longitudinal cuts each of which is discontinuous along a portion of its length, thereby providing a plurality of strips which are retained in fixed spatial relationship to each other by uncut portions; and continuously cross-cutting the plurality of strips at intervals such that the lengths of said uncut portions is no greater than the distance between successive cross-cuts.

3. A process as in claim 2 wherein the uncut portions in adjacent strips are staggered with relation to each other.

References Cited

UNITED STATES PATENTS

| 671,915 | 4/1901 | Curtis | 83—332 |
| 845,764 | 3/1907 | Curtis | 83—332 |
| 1,240,212 | 9/1917 | Horvath | 83—332 |
| 2,739,647 | 3/1956 | Coste | 83—408 |
| 2,776,711 | 1/1957 | Bas | 83—408 |

WILLIAM W. DYER, Jr., *Primary Examiner.*
JAMES M. MEISTER, *Examiner.*
L. TAYLOR, *Assistant Examiner.*